United States Patent
Schmitz et al.

(10) Patent No.: US 10,621,312 B2
(45) Date of Patent: Apr. 14, 2020

(54) METHOD FOR OPERATING A COMPUTER SYSTEM TO AUTHORIZE USE OF SOFTWARE ON A PROCESS COMPUTER

(71) Applicant: dSPACE digital signal processing and control engineering GmbH, Paderborn (DE)

(72) Inventors: Elmar Schmitz, Büren (DE); Albert Schwarte, Paderborn (DE); Guido Schäfergockel, Paderborn (DE); Thorsten Brehm, Paderborn (DE)

(73) Assignee: DSPACE DIGITAL SIGNAL PROCESSING AND CONTROL ENGINEERING GMBH, Paderborn (DE)

( * ) Notice: Subject to any disclaimer, the term of this patent is extended or adjusted under 35 U.S.C. 154(b) by 211 days.

(21) Appl. No.: 15/783,159

(22) Filed: Oct. 13, 2017

(65) Prior Publication Data
US 2018/0107808 A1   Apr. 19, 2018

(30) Foreign Application Priority Data
Oct. 14, 2016  (DE) .......................... 10 2016 119 658
Sep. 13, 2017  (DE) .......................... 10 2017 121 167

(51) Int. Cl.
*G06F 21/10* (2013.01)
(52) U.S. Cl.
CPC .... *G06F 21/105* (2013.01); *G06F 2221/0704* (2013.01)
(58) Field of Classification Search
CPC ................. G06F 21/105; G06F 2221/0704
See application file for complete search history.

(56) References Cited

U.S. PATENT DOCUMENTS 4,924,378 A * 5/1990 Hershey ............... G06F 21/105
                                                     705/59
5,023,907 A * 6/1991 Johnson ............... G06F 21/105
                                                     710/200

(Continued)

OTHER PUBLICATIONS

Search Report for German application No. 102016119658.4, dated Jul. 11, 2017.

(Continued)

*Primary Examiner* — J. Brant Murphy
(74) *Attorney, Agent, or Firm* — Orrick, Herrington & Sutcliffe LLP; Joseph A. Calvaruso

(57) ABSTRACT

In a method for operating a process computer that is at least intermittently connected to a user computer that executes a configuration program that can transmit executable binary code to the process computer, there is provision for a license check. The binary code has associated license information that indicates required licenses, and the configuration program is set up to receive an explicit identification of the process computer. The configuration program supplies an authorization program with the identification and with the license information. The authorization program establishes a permissibility by checking whether the available licenses associated with the explicit identification cover the licenses required according to license information, and the configuration program transmits the executable binary code to the process computer only if the authorization program has established the permissibility. The disclosure further relates to a user computer and a computer program product.

10 Claims, 4 Drawing Sheets

(56) References Cited

U.S. PATENT DOCUMENTS

| | | | | |
|---|---|---|---|---|
| 5,103,476 A * | 4/1992 | Waite | G06F 21/125 705/59 |
| 5,579,222 A * | 11/1996 | Bains | G06F 11/34 705/16 |
| 6,766,305 B1 * | 7/2004 | Fucarile | G06F 21/10 705/317 |
| 7,831,517 B1 * | 11/2010 | Vijay | G06F 21/121 705/59 |
| 2004/0117628 A1 * | 6/2004 | Colvin | G06F 21/121 713/176 |
| 2010/0211945 A1 * | 8/2010 | Doui | G06F 21/105 717/176 |
| 2010/0293080 A1 * | 11/2010 | Shah | G06F 8/34 705/34 |
| 2010/0324983 A1 * | 12/2010 | Etchegoyen | G06F 21/10 705/14.23 |
| 2012/0143766 A1 * | 6/2012 | Zheng | G06Q 30/06 705/59 |
| 2013/0185197 A1 * | 7/2013 | Brown | G06F 21/105 705/39 |
| 2014/0165053 A1 * | 6/2014 | Escobar-Olmos | G06F 21/105 717/178 |
| 2015/0319148 A1 * | 11/2015 | Lemelev | G06F 21/10 726/30 |
| 2017/0344729 A1 * | 11/2017 | Kohli | G06F 21/105 |

OTHER PUBLICATIONS

Digital rights management. In: Wikipedia, The free encyclopedia. Treatment state: Oct. 8, 2016. URL: https://de.wikipedia.org/wiki/Digitale_Rechteverwaltung?oldid=158567422 [called away on Jul. 11, 2017].

Software asset managemet. In: Wikipedia, The free encyclopedia. Treatment state: Nov. 4, 2015. URL: https://de.wikipedia.org/wiki/Lizenzmanagement?oldid=147662406 [called away on Jul. 11, 2017].

Extended Search Report for European application No. 17192870.8, dated Mar. 12, 2018.

* cited by examiner

METHOD FOR OPERATING A COMPUTER SYSTEM TO AUTHORIZE USE OF SOFTWARE ON A PROCESS COMPUTER

CROSS REFERENCE TO RELATED APPLICATIONS

This application claims the benefit of German patent application no. 102016119658.4, filed on Oct. 14, 2016, and German patent application no. 102017121167.5, filed on Sep. 13, 2017. The entire contents of both applications are hereby incorporated by reference in its entirety.

FIELD OF THE INVENTION

The invention relates to a method for operating a process computer or a computer system comprising a process computer and a user computer. In particular, the disclosed system provides license verification for software loaded onto the process computer from an at least intermittently connected user computer. The disclosed system further comprises a computer program product embodying the described systems.

BACKGROUND OF THE INVENTION

Technical measures that tie the execution of a software program to the presence of an applicable license are widespread. By way of example, EP 0623073 B1 discloses a computer system comprising a computer and a security apparatus detachably coupled thereto, in which a license manager running in the computer checks whether application programs are licensed and allows execution only if this is affirmed. For the check, the license manager uses a license table stored in the memory of the computer. The security apparatus includes an identity that is periodically checked by the license manager. If the reported identity does not match an expected identity value that is stored in the license manager, then the approval for the execution of the application programs is withdrawn.

Methods are also known for tying a software program to a particular computer, such as when a Windows operating system is activated. Typically such software programs are sold to customers as executable binary code.

Also, for the sale of physical media, there may be provision for a computer that is used for playback to be tied to the medium by virtue of an explicit identification of the computer being ascertained and transmitted to a license server by a licensing application installed on the computer. By way of example, US 2010/0324983 A1 discloses a system and a method for selling media in which not only are medium and computer tied but also the purchase of a license is handled via the server.

For the development of process computers that are used in an automobile as controllers, for example, model-based code development and/or model-based simulation of the influenced system are being used to an increasing extent. This frequently involves special process computers such as hardware-in-the-loop simulator systems or rapid-control-prototyping platforms being used. These are often programmed using graphical models that serve as a basis for producing executable binary code. The design of models frequently involves commercial libraries being used that provide building blocks for the overall system. Since the creation of a library often requires considerable prior knowledge and entails a high level of effort, the libraries are also costly and worth protecting.

Against this background, it is an object of the invention to specify a method and an apparatus that allow secure license inspection for such libraries used to create an executable binary code. This object is achieved by a method for operating a process computer having the features discussed below.

BRIEF SUMMARY OF THE INVENTION

The disclosure herein thus provides a method for operating a process computer, including for example a realtime process computer, wherein the process computer is at least intermittently connected to a user computer that executes a configuration program that can transmit executable binary code to the process computer. The binary code has associated license information that indicates which licenses are required. The license information and the required licenses are determined at least in part subject to the libraries or building blocks used for creating the executable binary code. The required licenses preferably reflect said libraries or building blocks; they are independent of an identification of a computer. The process computer has at least one explicit identification, such as a serial number of a processor, and the configuration program is set up to receive an explicit identification of the process computer. The configuration program supplies an authorization program likewise executed on the user computer with the explicit identification of the process computer and with the license information associated with the binary code. A secure data container of the user computer stores an association list comprising one or more explicit identifications of a process computer and in each case one or more associated available licenses. Preferably, the authorization program can access the association list or check or receive single associations between an explicit identification and an available license. To establish a permissibility, the authorization program checks whether the available licenses associated with the explicit identification of the currently connected process computer cover the licenses required according to license information, and the configuration program transmits the executable binary code to the process computer only if the authorization program has established the permissibility.

The process computer relates primarily to realtime hardware platforms that are set up to receive input variables such as sensor signals and to produce output variables such as actuation signals for actuators, a prescribed maximum latency of preferably 100 ms, particularly preferably 10 ms, particularly 1 ms, not being exceeded between a change in an input variable and the corresponding change in an output variable. The method according to the disclosure can also be applied to any embedded system, as long as said embedded system has an interface for the connection of a user computer. This connection could be hard-wired or through a radio interface. In the case of a realtime process computer, the method according to the disclosure is particularly advantageous because the occurrence of increased latency caused by a license check is safely avoided.

Preferably, the license information and the required licenses are at least in part determined subject to the libraries or building blocks used for creating the executable binary code, with the result that it is prescribed for one or more libraries that the execution of the binary code can be effected only if a license for the respective library is on hand on the currently used process computer or is associated with the explicit identification thereof. Preferably, if the license information reflects the libraries used, this means that each library used from a list of monitored libraries has an associated required license.

Preferably, the license information comprises not only the type of the required licenses but also an indication of the number of respectively required licenses, with more than one license of a particular type possibly being required.

There may also be provision for the license for a library to be offered in different versions, particularly with a license with a higher version number also permitting the use of executable binary code that has been created using a library in a previous version. Hence, existing binary code can continue to be used unimpeded. Further, there may also be provision for a date to be associated with licenses, this license then preferably being able to be used to transmit executable binary code that has been created before the associated date.

Preferably, the available licenses are permanently associated with an explicit identification of the process computer. The explicit identification may particularly be a serial number of a processor of the process computer. A serial number of a hardware interface can also be used as an explicit identification, so long as it can be read electronically, but not manipulated. The explicit identification of a process computer may also be defined on the basis of a combination of different features. On account of the fixed association between available licenses and an explicitly identified process computer, it is also irrelevant to the reliability of the method if the transmitted binary code is stored on a nonvolatile memory of the process computer. Once the availability of a license has been checked, it is not necessary to encumber the process computer with further license checks. The process computer can boot as often as desired from the switched-off state, even if there is no connection to the user computer.

The binary code may be sequential program code, comprise multiple threads or be realized at least in part as an FPGA configuration if the process computer has one or more programmable logic chips (a field-programmable gate array, or "FPGA"). To use the method according to the disclosure, it is merely necessary for information about the libraries used to be ascertained and suitably stored, particularly in the file including the binary code, when the binary code is created. In this case, it is irrelevant, in principle, whether the executable binary code has been created on the user computer or an externally produced binary code is transmitted from the user computer to the process computer.

Advantageously, the method according to the disclosure makes certain that only such executable binary code as has been created using licensed libraries is executed. This avoids scenarios in which executable binary code is created on a single computer with a single valid license for a library and can then be executed on a multiplicity of process computers without a valid license for the library. In other words, the method according to the disclosure allows license misuse or overuse of licenses to be reliably prevented. Binary code, once created, can be executed on different process computers, in principle, since the executable binary code itself is used to store only the license requirement, and the presence of an applicable license is ensured or checked by the authorization program on the basis of the information about available licenses that is on hand on the user computer. The identification associated with an available license can be compared directly with the identification of the connected process computer.

When process computers are used in security-relevant areas, they may be referred to as critical process computers. An example of a critical process computer is a controller that performs driving dynamics regulation on a vehicle, in which case a malfunction could cause severe material damage or even personal injury. Since the method according to the disclosure involves the license check being effected during or before the transmission of the executable binary code, it is certain that a process computer, once started, can also permanently provide the desired function without suddenly terminating execution on account of a license being absent, possibly even only allegedly. The process computer executes binary code permissibly transmitted on one occasion reliably, the permanent tie between the available license and the explicit identification of the process computer preventing misuse even without a further license check. Advantageously, the method according to the disclosure can thus also be used safely with critical process computers, since the license check cannot cause failure of the process computer during operation.

In addition, the method according to the disclosure is efficient and inexpensive, since neither additional hardware nor a specific software module—such as a runtime environment—is necessary on the process computer itself. Therefore, no encumbrance of the processor of the process computer arises either, and the method according to the disclosure can be used with any embedded systems.

According to one preferred embodiment of the disclosure, the authorization program reads the available licenses associated with an explicit identification from a hardware dongle or receives said licenses therefrom. A hardware dongle can be made manipulation-proof very easily and can additionally be transferred without difficulty when the user computer needs to be changed, for example. In principle, a secure data container can also be integrated into the user computer, however, whether as a separate hardware component or as a suitable software program. There could also be provision for the secure data container to be integrated into the authorization program, for example by adding software modules for writing and reading encrypted files. Preferably, the association between available license and explicit identification is permanently stored in the secure data container.

When a process computer is sold, a number of licenses can be supplied with it by virtue of an applicable number of licenses of an applicable type being associated with the explicit identification of the process computer. The available licenses can be sold, in particular, by virtue of a separate secure data container being included with the process computer, that is to say a hardware dongle that can be connected to a user computer. Accordingly, there may also be provision for a license for a library to be sold, said license being tied to one or more process computers. In one embodiment, suitably secure transmission of the available licenses from a license server to one or more user computers can be effected. Even if the available licenses are stored on multiple user computers, no misuse can take place, since they are associated with the same explicit identification of a process computer. No internet connection is necessary for the method according to the disclosure for operating a process computer, since the available licenses are stored on a secure data container of the user computer.

Preferably, the binary code and the associated license information are included in a file, the license information being encrypted and preferably comprising a hash value of the associated binary code. This allows license information to be reliably tied to the associated binary code and hence manipulations to be prevented. The executable binary code can continue to be executed on any process computers as soon as an applicable number of available licenses is associated therewith or with the explicit identification thereof. In addition, handling is also simple, since a transfer requires only a single file to be transmitted. In principle, the configuration program can supply the license information to the authorization program by virtue of the whole file comprising the binary code being handed over.

For process computers that have multiple processors, there is provision, in one advantageous configuration, for the binary code to be able to be executed on one or more of the processors when all the licenses available for an arbitrary processor of the process computer, in total, cover the license requirement. In this context, the term multiple processors is also intended to cover the case of multiple processor cores that respectively have an individual serial number as identification. License requirement in this context means the sum total of all required licenses. Advantageously, it is thus possible for available licenses to be shared between the single processor cores of a multicore system if said processor cores are physically connected to one another or arranged in a process computer.

According to one preferred embodiment, the binary code that can be executed on a process computer is produced by compiling and linking a source code, and the license information is produced at least in part on the basis of the linked libraries. Suitable setup of the tool chain means that this has no associated effort for the user, but rather the required information, such as the name and version of a library used, for example, can be automatically ascertained during the build process and stored in the binary code. As a result of the license information being produced during the linking, it is certain for any programs created by the user that the required licenses accurately reflect the licensable libraries used. The producer of a library thus supplies not a prescribed license that is firmly tied to an executable binary code, but rather a tool for ascertaining the specific license requirement. It is therefore possible to check the existence of a license for statically or dynamically linked libraries used.

According to a particularly preferred embodiment of the disclosure, the binary code that can be executed on a process computer is produced at least in part on the basis of a graphical model that comprises one or more building blocks, and the license information is produced at least in part on the basis of the building blocks used for the graphical model. By way of example, a graphical model may be a block diagram that describes the temporal response and/or inner states of a dynamic system. The block diagram can include various blocks, which can also be sold singly as part of a block library, as building blocks. The building blocks can comprise an inner structure that involves a hierarchically superordinate block being implemented in a subordinate subsystem by multiple subordinate blocks. By way of example, internal implementation in the form of one or more subsystems allows a model of a vehicle to be offered as an easy-to-use building block. If the license information indicates both the type and the number of respectively required licenses, these can be produced particularly subject to the type and number of building blocks used. There may also be provision for different building blocks to be pooled in a block library and regarded as a single type of building block, particularly in respect of the required licenses.

Preferably, the user computer is connected to a server that manages a list of available licenses without an associated explicit identification, such as e.g. a serial number. When required, the user computer can extract one or more of the available licenses from the list, wherein the extracted licenses are combined with an explicit identification of a process computer, and wherein the explicit identification of a process computer connected to the user computer is used, after combination has been effected, by the authorization program to check the permissibility. In a larger working group having multiple user computers and to process computers, it is therefore possible for available licenses to be handled more flexibly. By virtue of the server being secured and the communication between the computers being encrypted, the method remains reliably protected against manipulations.

It is particularly preferable if the extracted licenses and the combined explicit identification are stored in a secure data container on the user computer, wherein the user computer removes an extracted license from the secure data container again and returns it to the server only when the binary code has been erased by the process computer or has been overwritten with another binary code, which does not require the applicable license. This ensures reliable operation even with an intermittently interrupted network connection between user computer and server.

Further, the disclosure relates to a user computer for configuring a process computer, comprising a processor, an interface and an encrypted data container, wherein the processor is set up to carry out a method according to the disclosure.

The disclosure additionally relates to a computer program product having a computer-readable storage medium on which commands are embedded that, when executed by a computing unit, cause the computing unit to be set up to carry out a method according to the disclosure.

The disclosure is explained in more detail below with reference to the drawings. In these, parts of the same type are labelled with identical designations. The embodiments depicted are highly schematized, i.e. the distances and the lateral and vertical dimensions are not to scale and, unless indicated otherwise, also have no derivable geometric relationships with one another.

DETAILED DESCRIPTION OF THE INVENTION

Figure 1:
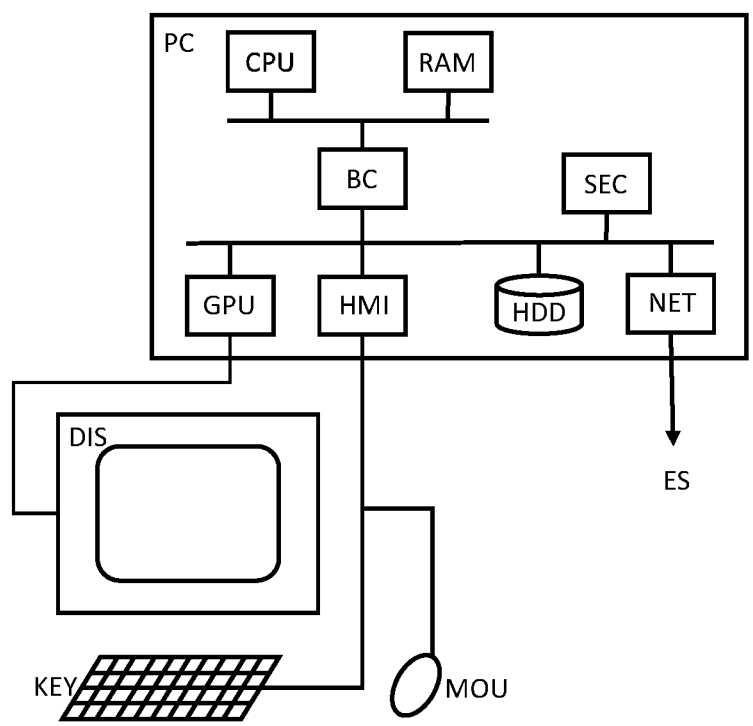
FIG. 1 shows a preferred embodiment of a user computer.

FIG. 1 shows a preferred embodiment of a user computer PC. Said user computer has a processor CPU, which can be realized particularly as a multicore processor, a main memory RAM and a bus controller BC. As a preference, the user computer PC is designed to be manually operated by a user directly, a monitor DIS being connected via a graphics card GPU and a keyboard KEY and a mouse MOU being connected by a peripheral interface HMI. In principle, the user computer PC could also have a touch interface. The user computer additionally comprises a nonvolatile data memory HDD, which may be embodied as a hard disk and/or solid state disk, in particular, and also an interface NET, particularly a network interface. One or more process computers ES may be connected via the interface NET. In principle, one or more arbitrary interfaces, particularly wired interfaces, may be on hand on the user computer PC and respectively able to be used for the connection to one or more process computers ES. Preferably, a network interface based on the Ethernet standard can be used, at least the physical layer being embodied in a standard-compliant manner; one or more higher protocol layers may also be implemented in a proprietary manner or in a manner adapted to suit the process computer. The interface NET may also be embodied in a wireless manner, such as particularly as a WLAN interface or based on a standard, such as Bluetooth. This may also be a mobile radio connection such as LTE, the interchanged data preferably being encrypted. It is advantageous if at least one interface of the user computer is embodied as a standard Ethernet interface, so that further user computers and/or servers can easily be connected to the user computer PC.

Further, the user computer PC has a secure data container SEC. This may be realized in the form of a dongle, for example, that is connected particularly to a peripheral interface. Alternatively, there may also be provision for a secure data container SEC to be firmly integrated in the user computer as an assembly or stored on the nonvolatile data memory HDD in the form of a file, the content preferably being protected against unauthorized access operations or manipulations by mechanisms of the operating system and/or a suitable management program.

Figure 2:
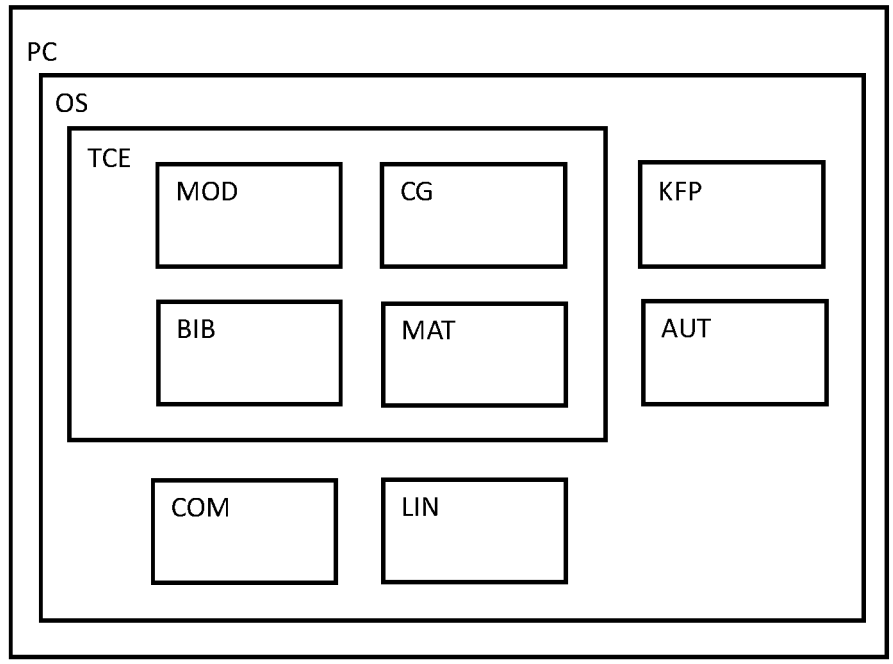
FIG. 2 shows a schematic depiction of the software components preferably on hand on a user computer.

FIG. 2 depicts a schema of the software components preferably installed on a user computer PC. These use mechanisms of the operating system OS in order to access the nonvolatile memory HDD or set up a connection to an external computer via the network interface NET, for example.

A technical computing environment TCE allows the creation of models and the production of simulation code from the models. Preferably, in a modelling environment MOD, it is possible to use a graphical user interface to create models of a graphical system. These may particularly be block diagrams that comprise multiple blocks that are connected to one another via signals and describe the temporal response and/or internal states of a dynamic system. Preferably, the block diagrams may be hierarchic, with a multiplicity of blocks in a subordinate plane describing the structure of a block in a superordinate plane. The computing environment TCE comprises one or more libraries BIB from which blocks or building blocks for constructing a model can be selected. In a script environment MAT, instructions can be input interactively or via a batch file in order to perform calculations or to modify the model. A code generator CG can be used to produce a simulation code, particularly a program code in a programming language such as C, from a created model.

The user computer PC has a compiler COM and a linker LIN that are preferably set up for producing binary files executable on a process computer ES. In principle, a multiplicity of compilers may be on hand, particularly cross compilers for different target platforms, in order to support process computers ES having different processor architectures.

In addition, a configuration program KFP and an authorization program AUTH are installed on the user computer. The configuration program KFP is set up to communicate with one or more process computers ES via the interface NET, so that executable binary code can be transmitted to a process computer ES, execution of the binary code can be started or stopped, and data can be interchanged between process computer ES and user computer PC. The authorization program AUT is set up to receive license information, that is to say details about licenses required for the execution of a binary code, and to read information about available licenses from a secure data container SEC, or to receive said information therefrom. If an executable binary code is intended to be transmitted to a process computer ESx (x=1, 2, 3, . . . ) having an explicit identification, the authorization program AUT compares the licenses required for the executable binary code with the licenses available for the process computer ESx, which are thus associated with the explicit identification of ESx.

The configuration program and the authorization program may be realized as separate software components or may be integrated in an executable file. There may be provision for the configuration program KFP and the authorization program AUT first to be authenticated to the respective other software component, for example by means of a challenge/response method. In addition, the authorization program may particularly be stored on the nonvolatile memory only in an encrypted form, in order to prevent manipulations. Further, there may be provision for the process computer to be set up to receive and/or execute only such executable binary code as has been transmitted by an authenticated configuration program and/or an authenticated user computer. For this purpose, the initialization of the process computer can comprise a challenge/response method between configuration program or user computer and process computer. The configuration program and/or authorization program may further be protected against manipulations by third parties using suitable mechanisms that are known in the art.

The disclosure can also be used when program code or source text is created manually by a programmer and libraries are merely incorporated. In this case, a technical computing environment TCE is not necessary on the user computer PC.

Figure 3:
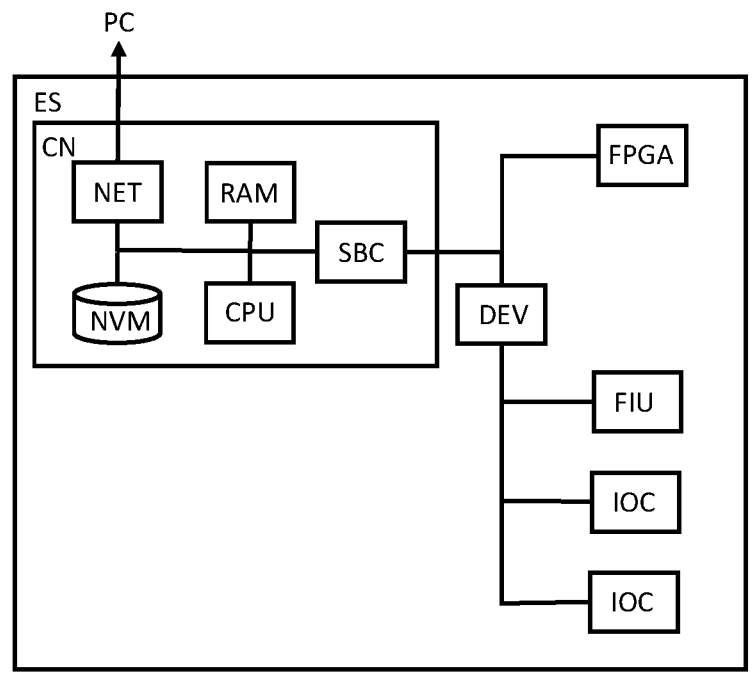
FIG. 3 shows a preferred embodiment of a process computer.

FIG. 3 shows a preferred embodiment of a process computer ES. Said process computer comprises a computing node CN that is connected to a user computer PC via a network interface NET. In principle, the connection needs to exist only while the configuration of the process computer ES is adapted. Preferably, it exists permanently. The computing node CN has at least one processor CPU, particularly a multicore processor, or multiple processors, a main memory RAM and a nonvolatile memory NVM that preferably stores an operating system and/or a bootloader. A high speed bus SBC and an applicable controller are preferably used to connect a logic board FPGA and a device interface DEV to the computing node. The logic board FPGA comprises a programmable logic chip that can be specifically configured to allow latency-free actuation of an electric motor, in particular. The device interface DEV can be used to connect a multiplicity of modules, such as a fault simulation circuit FIU, which applies defined electrical faults to connected devices, or interface cards IOC, which provide one or more analog or digital I/O channels. Preferably, libraries are provided for the fault simulation circuit FIU and/or the interface cards, in order to be able to actuate these easily in a model created by the user. There may also be provision for drivers for actuating the modules to be provided and for the use of a hardware module to be permitted only if a license exists. In this case, there may be provision for a driver to be combined with a single license, or for use of multiple hardware modules or multiple channels of a hardware module to require the existence of an applicable number of available licenses.

If the processor CPU of the process computer ES is a multicore processor, then an explicit identification can be associated with every single core; for the purposes of the disclosure, a multicore processor is therefore equivalent to multiple processors. Other components, such as particularly the logic board FPGA having one or more programmable logic chips, can also have an explicit identification. For the use as an explicit identification, particularly such properties of electronic chips as can easily be read electronically but can be changed only with difficulty or preferably not at all, and as have adequate individuality, are suitable. In principle, an explicit identification of a process computer ES can also be defined on the basis of the properties of multiple electronic chips, particularly the serial numbers of all installed processors or processor cores and/or all installed programmable logic chips and/or one or more installed interface or sensor chips.

The process computer ES shown is a complex and extensible system; in principle, the disclosure can also be used for embedded systems with minimal hardware resources, so long as said embedded systems are at least intermittently connected to a user computer PC or can be connected thereto for configuration.

Figure 4:
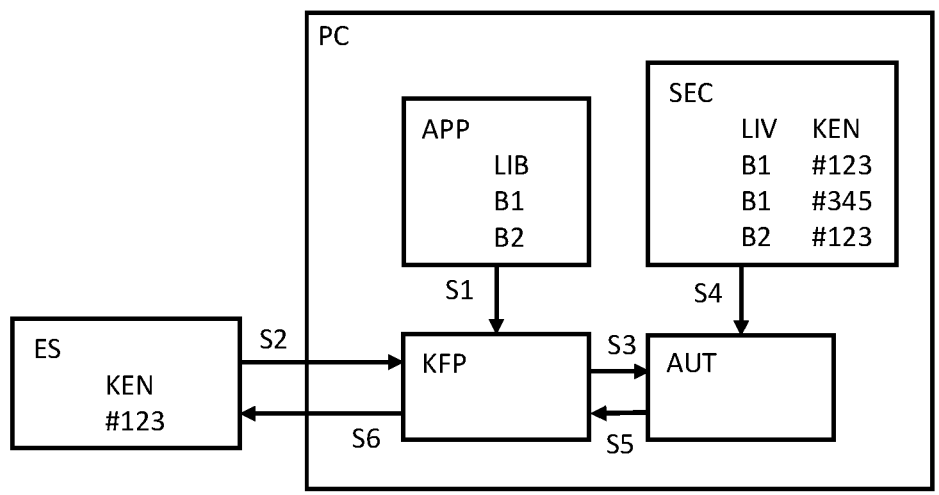
FIG. 4 shows a schematic depiction of a method according to the disclosure.

FIG. 4 schematically depicts the flow of a method according to the disclosure, indicating both software components that are involved and the user computer PC and the process computer ES.

In step S1, the configuration program KFP loads the executable binary code APP, for example from the nonvolatile data memory HDD. The executable binary code includes license information about the libraries used, particularly a list of the required licenses LIB. In the example shown, licenses are required for two libraries B1 and B2.

In step S2, the configuration program KFP receives an explicit identifier KEN from the process computer ES. In the example shown, the process computer ES has the identifier #123. This may particularly be the serial number of a processor CPU of the process computer ES.

The license information pertaining to the required licenses LIB and the explicit identifier KEN are supplied to an authorization program AUT in step S3. The authorization program AUT may be realized as a standalone program or as a subfunction of the configuration program KFP, for example; the information can be supplied particularly via mechanisms for interprocess communication or as arguments for a function call. There may also be provision for the executable binary code APP to be handed over completely.

In step S4, the authorization program AUT receives information about available licenses LIV from the secure data container SEC. In the example shown, a respective license for library B1 is associated with the identifier #123 and the identifier #345; in addition, the identifier #123 has an associated license for the library B2.

The authorization program compares the license information about required licenses LIB with the information about available licenses LIV that are associated with the indicated identifier of the connected process computer. In the present example, the executable binary code APP requires a respective license for the libraries B1 and B2. Since the identifier #123 of the process computer ES has a respective associated available license for the libraries B1 and B2, the available licenses LIV cover the required licenses LIB. The authorization program thus establishes the permissibility and communicates this to the configuration program KFP in step S5.

In step S6, the configuration program KFP subsequently transmits the executable binary code APP to the process computer ES. Additionally, it can also configure the latter according to the stipulations of the user, in order to set I/O channels as appropriate, for example. The process computer ES can now be used to regulate or simulate a physical process.

Figure 5:
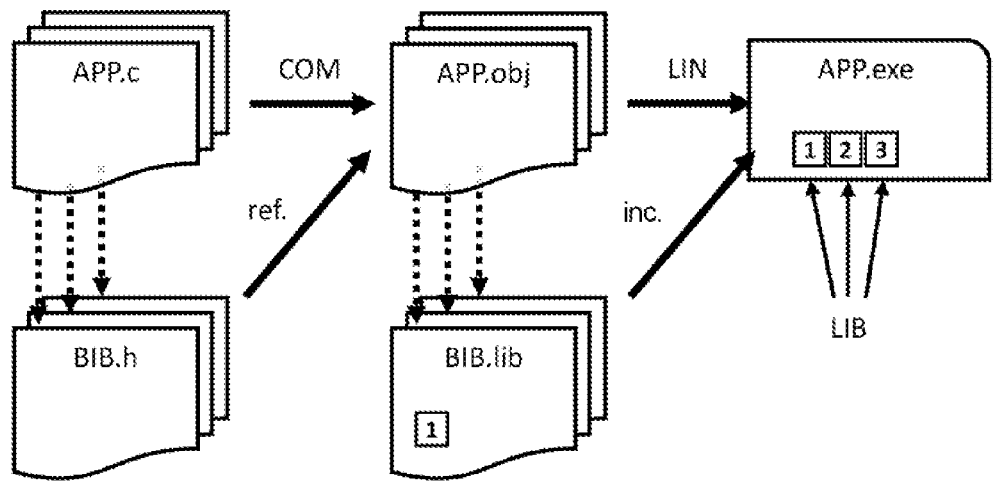
FIG. 5 shows a schematic depiction of a method for incorporating license information.

FIG. 5 shows a schematic depiction of an exemplary method that can be used to integrate license information into an executable binary file.

The source code APP.c generated on the basis of a model or produced manually requires one or more libraries, as indicated by dashed arrows. If the source code APP.c is compiled by the compiler COM, this also involves e.g. the referenced (ref.) header file BIB.h of a library being incorporated. The binary file APP.obj produced by the compiler is not yet executable on its own, but rather includes references to the binary files for the libraries used. Besides the executable code, e.g. the binary file BIB.lib also includes the license information associated with the library used. In particular, this may be a license string produced using a private key, which license string can be read by the authorization program using a publically available key. The linker LIN is used to incorporate (inc.) e.g. the binary file BIB.lib for the library used, in order to produce the binary code executable on the process computer. Preferably, a library is assigned a respective individual license string. If the source code uses multiple libraries, the respective applicable binary files for the libraries are incorporated. Since these respectively include the individual license string of the library, complete license information can be extracted from the executable binary code. In the example shown, required licenses LIB are indicated by numbered squares (1, 2, 3).

There may also be provision for the build process to involve a hash of the binary file APP.obj produced by the compiler being computed and being stored in the file with the complete executable binary code. The authorization program may be set up to receive the complete file with executable binary code and license information, to compute a hash and to permit transmission of the executable binary code only if the stored hash value matches the freshly computed one.

Figure 6:
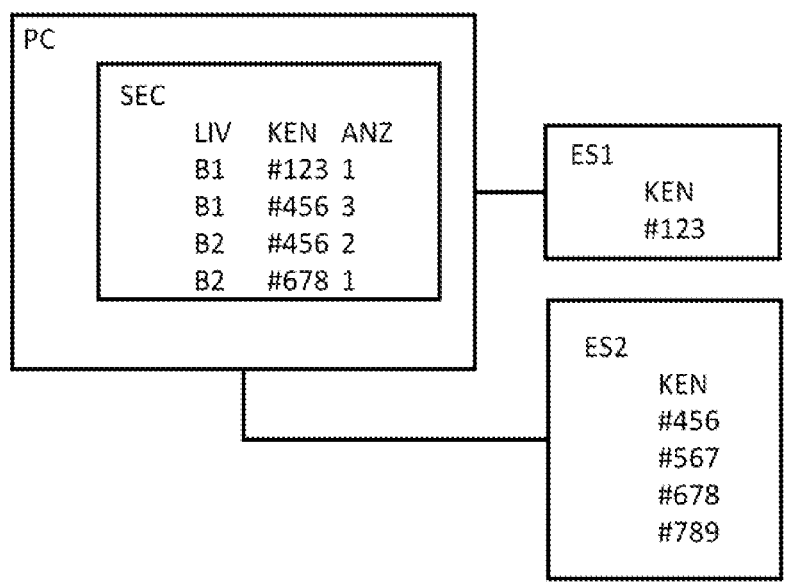
FIG. 6 shows a schematic depiction of a user computer that is connected to two process computers.

FIG. 6 schematically depicts a user computer PC that is connected to two process computers ES1, ES2.

The secure data container SEC of the user computer PC includes a list of available licenses LIV that are respectively associated with an explicit identification KEN. In principle, any number ANZ of available licenses LIV for a particular library can be associated with an explicit identification. In the example shown, the explicit identifier #123 has an associated license LIB for the library B1. The identifier #456 has three associated available licenses for the library B1 and two associated available licenses for the library B2, while the identifier #678 has one associated available license for the library B2.

The process computer ES1 has the explicit identification #123. Hence, an executable binary code that has been created using the library B1 can be executed on the process computer ES1. By contrast, an executable binary code that uses the library B2 cannot be transmitted to the process computer ES1 and executed for lack of an available license LIV.

In the example shown, process computer ES2 has the explicit identifications #456, #567, #678 and #789, for example because ES2 comprises a four-core processor whose single cores have the respective serial numbers. If executable binary code is now intended to be transmitted to ES2, the comparison between required licenses LIB and available licenses LIV can be effected such that it is sufficient for the permissibility if the licenses associated with the single explicit identifications, that is to say all the available licenses associated with any core of the processor, in total, correspond to the required licenses.

By way of example, it is thus possible for an executable binary code that uses the libraries B1 and B2 to be executed on any desired core of the processor. There may be provision for available licenses per processor core to be counted. In this case, three of the processor cores could each execute one instance of the binary code, there being no license available for the fourth processor core. Alternatively, there may also be provision for licenses per process computer to be counted—independently of the processor cores on hand in the computer. If the executable binary code is created on the basis of a model in a technical computing environment, there may also be provision for the required licenses to be ascertained on the basis of the number of building blocks or elements of a licensable library used.

As a result of all the nodes of a multiprocessor or multicore system sharing the accumulated available licenses and forming a license pool, license management is simpler and at the same time more flexible for the user.

Figure 7:
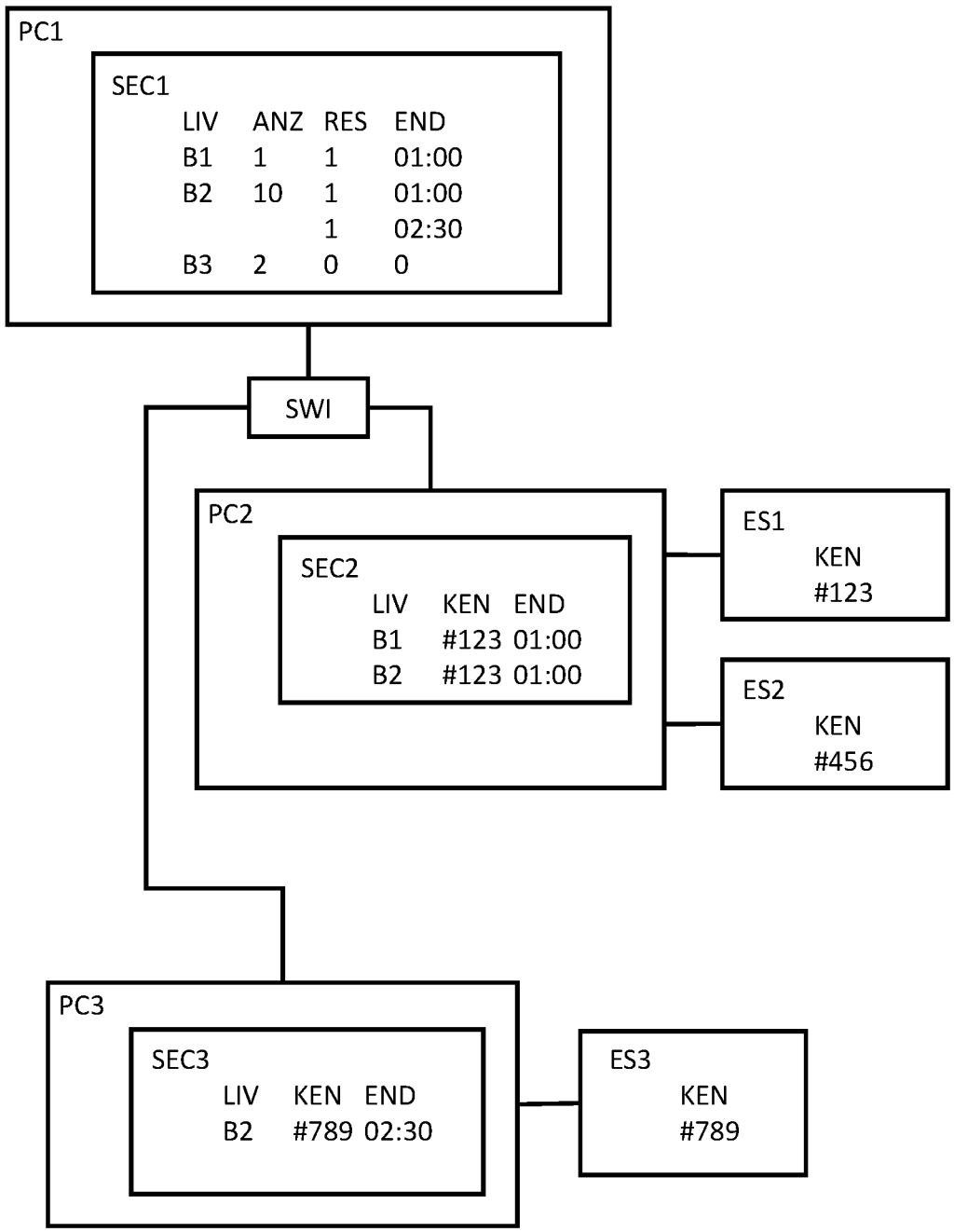
FIG. 7 shows a schematic depiction of a server that is connected to two user computers.

FIG. 7 shows a schematic depiction of a server PC1 that is connected to two user computers PC2 and PC3 via a network switch SWI. In principle, the server PC1 and the user computers PC2 and PC3 can have largely comparable hardware and software, but they differ at least in the configuration of the secure data container SEC.

The secure data container SEC1 of the server PC1 is set up to loan available licenses LIB for a prescribed time. There may be one or more licenses available for the respective library, as indicated in the field ANZ. In addition, there is the possibility of reserving licenses by virtue of an appropriate marker being set in the field RES. A reservation is valid only for a particular period, an applicable time of day being indicated in a field END. In principle, it is also possible for a remaining time to run or an end date to be indicated or stored. In the example shown, a license is available for library B1, a license being reserved up to the time 01:00. At present, it is therefore not possible for any licenses to be loaned for the library B1. For the library B2, ten licenses are available, in principle, in the example shown, one license being reserved up to the time 01:00 and a further license up to the time 02:30. At present, it is therefore possible for another eight licenses to be loaned for library B2. In the example shown, there are additionally two licenses available for the library B3, with no license being reserved.

The user computer PC2 is connected to two process computers ES1 and ES2. The secure data container SEC2 of PC2 is set up such that for an available license LIB there is an indication of the identification KEN with which it is associated, and up to what time END the license remains valid. In the example shown, the identifier #123 has a respective associated available license for the libraries B1 and B2. Hence, it is possible to transmit to the process computer ES1 having the identifier #123 any executable binary code that uses the libraries B1 and/or B2. If an executable binary code that uses the library B3 needs to be transmitted, this is initially not possible.

The user computer PC3 is connected to a process computer ES3. The secure data container SEC3 of PC3 is set up such that for an available license LIV there is an indication of the identification KEN with which it is associated, and up to what time END the license remains valid. In the example shown, the identifier #789 has an associated available license for the library B2. Since the process computer ES3 has the identifier #789, any executable binary code that uses the library B2 can be transmitted. If an executable binary code that uses the library B1 needs to be transmitted, this is initially not possible.

If an executable binary code needs to be transmitted to a process computer whose identifier has no associated available license for this library, then the user computer must attempt to borrow a license from the server PC1. If, by way of example, an executable binary code that uses the library B2 needs to be transmitted to the process computer ES2, then the user computer PC2 requests an applicable license from the server PC2. Subsequently, the server PC1 reserves an available license for B2 and sets a time for the expiry of the license. This information is stored in the secure data container SEC1 of the server PC1 and transmitted to the user computer PC2. Subsequently, the user computer PC2 combines the available license LIV for library B2 with the identifier #456 of process computer ES2 and stores the information in its secure data container SEC2. Up until the expiry of the license or the end of the loan period, it is now possible for executable binary code that uses the library B2 to be transmitted to the process computer ES2.

A client/server architecture as has been described above allows flexible use of licenses in larger working groups. To continue to ensure reliable license management, it is preferable to take one or more of the following security measures: the clocks of the computers involved should be synchronized, the transmission via the network should be encrypted, and the single computers must authenticate themselves to one another in a suitable manner.

What is claimed is:

1. A method for operating a process computer comprising:
connecting the process computer to a user computer at least intermittently;
executing a configuration program by the user computer, wherein the user computer is adapted to transmit executable binary code to the process computer;
wherein the executable binary code has associated license information that indicates required licenses;
wherein the required licenses are determined at least in part subject to libraries or building blocks used for creating the executable binary code and wherein the required licenses are independent of an identification of a computer;
wherein the configuration program is set up to receive an explicit identification of the process computer;
wherein the configuration program supplies an authorization program with the explicit identification and with the license information;
executing the authorization program on the user computer;
retrieving at least one available license from an association list in a secure data container of the user computer, wherein the association list comprises one or more explicit identifications and in each case one or more associated available licenses;
wherein the authorization program establishes a permissibility by checking whether the available licenses associated with the explicit identification of the process computer cover the required licenses according to license information; and
wherein the configuration program transmits the executable binary code to the process computer only if the authorization program has established the permissibility.

2. The method of claim 1, wherein the secure data container is embodied as a hardware dongle that is connected to the user computer or integrated therein, wherein the authorization program receives the available licenses associated with an explicit identification from the secure data container.

3. The method of claim 1, wherein the binary code and the associated license information are included in a file, wherein the license information is encrypted and comprises a hash value of the binary code.

4. The method of claim 1, wherein the process computer has multiple processors, wherein the binary code can be executed on any one or more of the processors when all the licenses available for an arbitrary processor of the process computer, in total, cover the required licenses.

5. The method of claim 1, wherein the binary code that can be executed on a process computer is produced by compiling and linking a source code, and wherein the license information is produced at least in part based on libraries linked to the source code.

6. The method of claim 1, wherein the binary code that can be executed on the process computer is produced at least in part based on a graphical model that comprises one or more building blocks, and wherein the license information is produced at least in part based on the building blocks.

7. The method of claim 1, wherein the user computer is connected to a server, wherein the server manages a list of available licenses without an associated explicit identification, wherein the user computer extracts one or more of the available licenses from the list, wherein the extracted licenses are combined with the explicit identification of a process computer, and wherein the explicit identification of a process computer connected to the user computer is used, after combination has been effected, by the authorization program to check the permissibility.

8. The method of claim 7, wherein the extracted licenses and the combined explicit identification are stored in a secure data container on the user computer, wherein the user computer removes an extracted license from the secure data container again and returns it to the server only when the binary code has been erased by the process computer or has been overwritten with another binary code.

9. A user computer for configuring a process computer, comprising a processor, an interface and an encrypted data container, wherein the processor is set up to carry out the method of claim 1.

10. A computer program product having a non-transitory computer-readable storage medium on which commands are embedded that, when executed by a processor, cause the processor to be set up to carry out the method of claim 1.

* * * * *